United States Patent
Penha et al.

(10) Patent No.: US 12,118,040 B1
(45) Date of Patent: Oct. 15, 2024

(54) SYSTEMS AND METHODS FOR GENERATING SYNTHETIC QUERIES

(71) Applicant: Spotify AB, Stockholm (SE)

(72) Inventors: Gustavo Penha, Amsterdam (NL); Enrico Palumbo, Turin (IT); Maryam Aziz, Princeton Junction, NJ (US); Alice Wang, New York, NY (US); Hugues Bouchard, Barcelona (ES)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 18/298,988

(22) Filed: Apr. 11, 2023

(51) Int. Cl.
*G06F 16/9032* (2019.01)

(52) U.S. Cl.
CPC ............... *G06F 16/90324* (2019.01)

(58) Field of Classification Search
CPC ........... G06F 16/248; G06F 16/2455; G06F 16/2465; G06F 16/24553; G06F 3/04847; G06F 16/245
USPC ........................................................ 707/759
See application file for complete search history.

(56) References Cited

U.S. PATENT DOCUMENTS

| | | | |
|---|---|---|---|
| 11,010,421 B2 * | 5/2021 | Yada | G06F 16/532 |
| 2006/0230022 A1 | 10/2006 | Bailey et al. | |
| 2013/0110872 A1 | 5/2013 | Barga et al. | |
| 2014/0195519 A1 | 7/2014 | Holt et al. | |
| 2016/0196335 A1 | 7/2016 | Vee et al. | |
| 2017/0220575 A1 * | 8/2017 | Hohwald | G06N 20/00 |
| 2021/0357409 A1 * | 11/2021 | Rodriguez | G06F 40/157 |

OTHER PUBLICATIONS

Nogueira et al., "From dc2query to docTTTTTquery", Epistemic AI, David R. Cheriton School of Computer Science, University of Waterloo, 3 pgs.
Bonifacio et al., "InPars: Data Augmentation for Information Retrieval using Large Language Models", Zeta Alpha, NeuralMind, University of Campinas, University of Waterloo, arxiv.org, Feb. 10, 2022, 15 pags.

* cited by examiner

*Primary Examiner* — Hung T Vy
(74) *Attorney, Agent, or Firm* — Morgan, Lewis & Bockius LLP

(57) ABSTRACT

An electronic device provides, to a model trained to generate synthetic queries, information corresponding to a first media content item and a first value for a parameter indicative of query specificity. The device receives, from the model trained to generate synthetic queries, a first query corresponding to the first media content item, wherein the first query is generated in accordance with the first value for the parameter indicative of query specificity. The device provides, to a client device for display at the client device, the first query and receives user selection of the first query. In response to the user selection of the first query, the device provides a first result set of media content items for the first query.

20 Claims, 8 Drawing Sheets

500

502 Prior to providing information corresponding to a first media content item to a model trained to generate synthetic queries:
  receive, from a client device, a second query input by a user of the client device; and
  determine a second result set of media content items for the second query that includes the first media content item;
  wherein the information corresponding to the first media content item is provided to the model trained to generate synthetic queries in accordance with the second result set of media content items for the second query including the first media content item.

504 Prior to providing the information corresponding to the first media content item to the model trained to generate synthetic queries:
  generate, without human labeling, training data for the model; and
  train the model to generate synthetic queries using the training data for the model.

506 Generating, without human labeling, the training data for the model includes:
  obtaining information corresponding to a second media content item;
  generating a first training query for the second media content item by applying, to the information corresponding to the second media content item, a first set of rules for generating training queries having a first training value of the parameter indicative of query specificity; and
  generating a second training query for the second media content item by applying, to the information corresponding to the second media content item, a second set of rules for generating training queries having a second training value of the parameter indicative of query specificity.

508 Training the model to generate synthetic queries using the training data for the model includes training the model using:
  the first training query and the first training value; and
  the second training query and the second training value.

510 Provide, to the model trained to generate synthetic queries:
  information corresponding to the first media content item; and
  a first value for a parameter indicative of query specificity.

512 The information corresponding to the first media content item includes metadata for the first media content item.

FIG. 5A

SYSTEMS AND METHODS FOR GENERATING SYNTHETIC QUERIES

TECHNICAL FIELD

The disclosed embodiments relate generally to media provider systems, and, in particular, to using a trained model to generate queries (e.g., for search).

BACKGROUND

Recent years have shown a remarkable growth in consumption of digital goods such as digital music, movies, books, and podcasts, among many others. The overwhelmingly large number of these goods often makes navigation and discovery of new digital goods an extremely difficult task. To cope with the constantly growing complexity of navigating the large number of goods, there is an increased need for improved methods of searching for and locating media items of interest, as well as a need for improved methods of aiding users in the discovery of new media content.

SUMMARY

A media content provider may enable users to input search queries to easily discover and navigate to various media content. A user's search query may, in some cases, be representative of the user's intent, such as whether the user is looking for a specific media content item or if the user is browsing (e.g., more generally) for a type of content that matches the search query. In some embodiments, the media content provider may recommend synthetic search queries to the user to improve the user's browsing experience while reducing a number of inputs required from the user to continue modifying (e.g., or tailoring) the input search query.

In the disclosed embodiments, systems and methods are provided for training a system to generate synthetic queries based on an original query (e.g., input by the user). The generated synthetic queries are generated as either broad queries or narrow queries. The generated synthetic queries are suggested to the user to improve content recommendations. For example, a narrow query is input by the user, and the system generates a broad query, from the narrow query, in order to provide additional search results that may not have been identified from the narrow query.

To that end, in accordance with some embodiments, a method is provided. The method includes providing, to a model trained to generate synthetic queries: information (e.g., metadata) corresponding to a first media content item (e.g., an identifier of the first media content item); and a first value for a parameter indicative of query specificity (sometimes referred to as a specificity parameter). The method includes receiving, from the model trained to generate synthetic queries, a first query corresponding to the first media content item, wherein the first query is generated in accordance with the first value for the parameter indicative of query specificity. The method further includes providing, to a client device for display at the client device, the first query and receiving user selection of the first query. The method includes, in response to the user selection of the first query, providing a first result set of media content items for the first query.

In some embodiments, the first media content item is a result of a search performed in response to a user-entered search query (e.g., entered by the same user that is provided the first result set of media content items, as a suggestion for the user to refine their query to have broader or narrow intent). As a more specific example, in some embodiments, a method includes receiving a user-entered search query and performing a search using the user-entered search query to obtain a set of results of the user-entered search query. The method further includes providing a subset of the results (e.g., the top k results, where k is an integer such as 1, 2, 5, or 10) and a first value for a parameter indicative of query specificity to a model trained to generate synthetic queries (e.g., a respective query for each of the top k results). In some embodiments, providing the first set of results comprises providing metadata for the first set of results (e.g., an identifier of the respective media content items in the first set of results). The model generates, based on the inputs, one or more generated queries that are different from the user-entered query (e.g., according to the specificity parameter) and provides the one or more generated queries as user-selectable options for that query. In some embodiments, the user-selectable options for that query are displayed concurrently with results for the user-entered query. In some embodiments, the method includes receiving a user selection of a respective one of the generated queries and, in response to the user selection, providing results for the respective one of the generated queries (e.g., by displaying the results on a user interface, replacing the results for the user-entered query, providing playback of the results, etc.)

In accordance with some embodiments, an electronic device is provided. The electronic device includes one or more processors and memory storing one or more programs. The one or more programs include instructions for performing any of the methods described herein.

In accordance with some embodiments, a non-transitory computer-readable storage medium is provided. The non-transitory computer-readable storage medium stores one or more programs for execution by an electronic device with one or more processors. The one or more programs comprising instructions for performing any of the methods described herein.

Thus, systems are provided with improved methods for generating synthetic queries.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 5A-5B are flow diagrams illustrating a method of generating synthetic queries, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
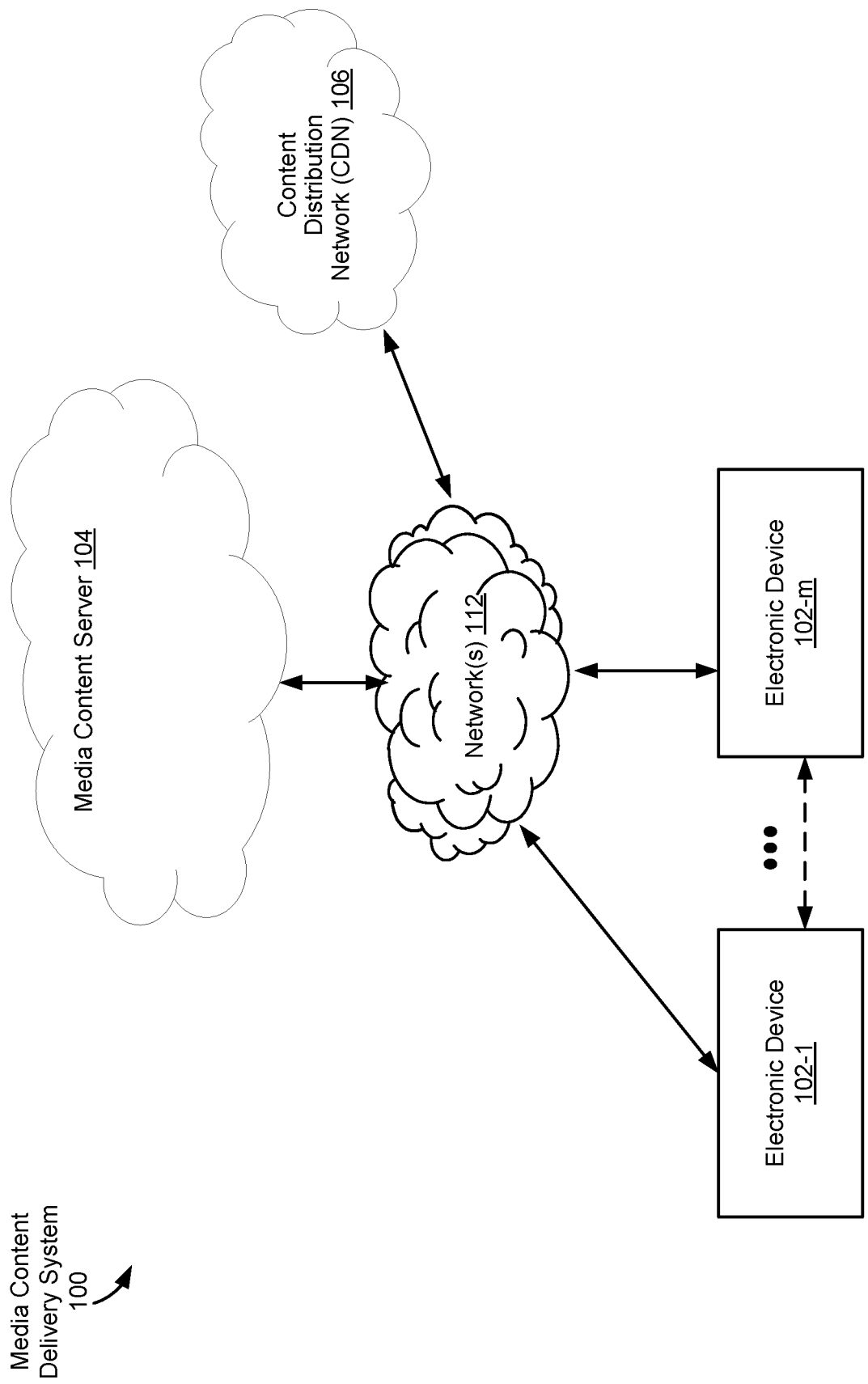
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, podcasts, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
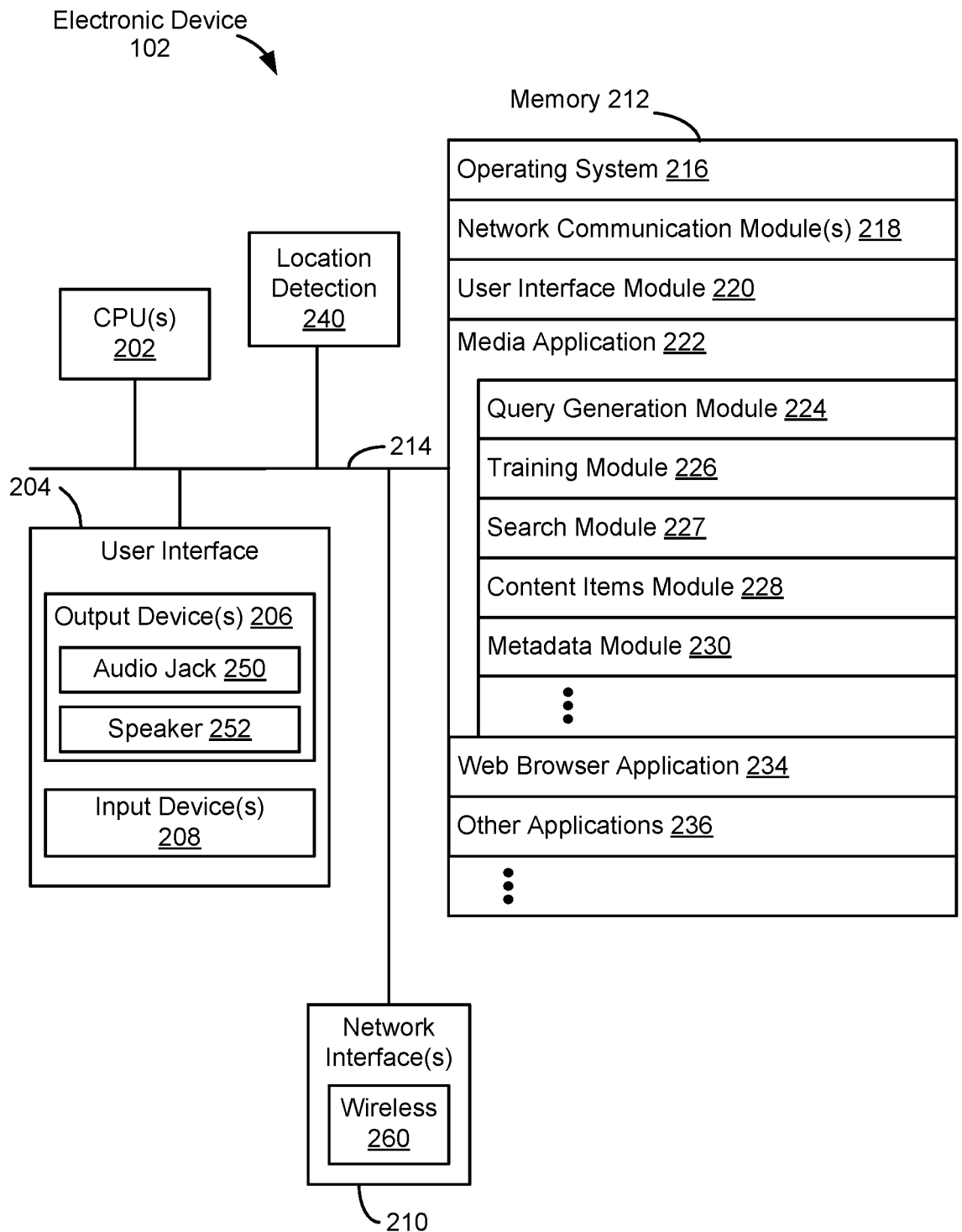
FIG. 2 is a block diagram illustrating an electronic device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

an operating system 216 that includes procedures for handling various basic system services and for performing hardware-dependent tasks;

network communication module(s) 218 for connecting the client device 102 to other computing devices (e.g., media presentation system(s), media content server 104, and/or other client devices) via the one or more network interface(s) 210 (wired or wireless) connected to one or more network(s) 112;

a user interface module 220 that receives commands and/or inputs from a user via the user interface 204 (e.g., from the input devices 208) and provides outputs for playback and/or display on the user interface 204 (e.g., the output devices 206);

a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:

a query generation module 224 for generating synthetic queries using a trained model, optionally based on a parameter indicating specificity of the synthetic query (e.g., broad or narrow);

a training module 226 for training the model for generating synthetic queries;

a search module 227 for performing one or more searches based on a user-input query and/or one or more synthetic queries (e.g., selected by the user), including displaying one or more search results that match search criteria of the one or more searches;

a content items module 228 for storing media items, including audio items such as podcasts and songs, for playback and/or for forwarding requests for media content items to the media content server;

a metadata module 230 for storing metadata associated with each media item in content items module 228. In some embodiments, a respective content item and metadata for the content item are provided to the query generation module 224 to generate a query based on the respective content item and associated metadata;

a web browser application 234 for accessing, viewing, and interacting with web sites; and other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
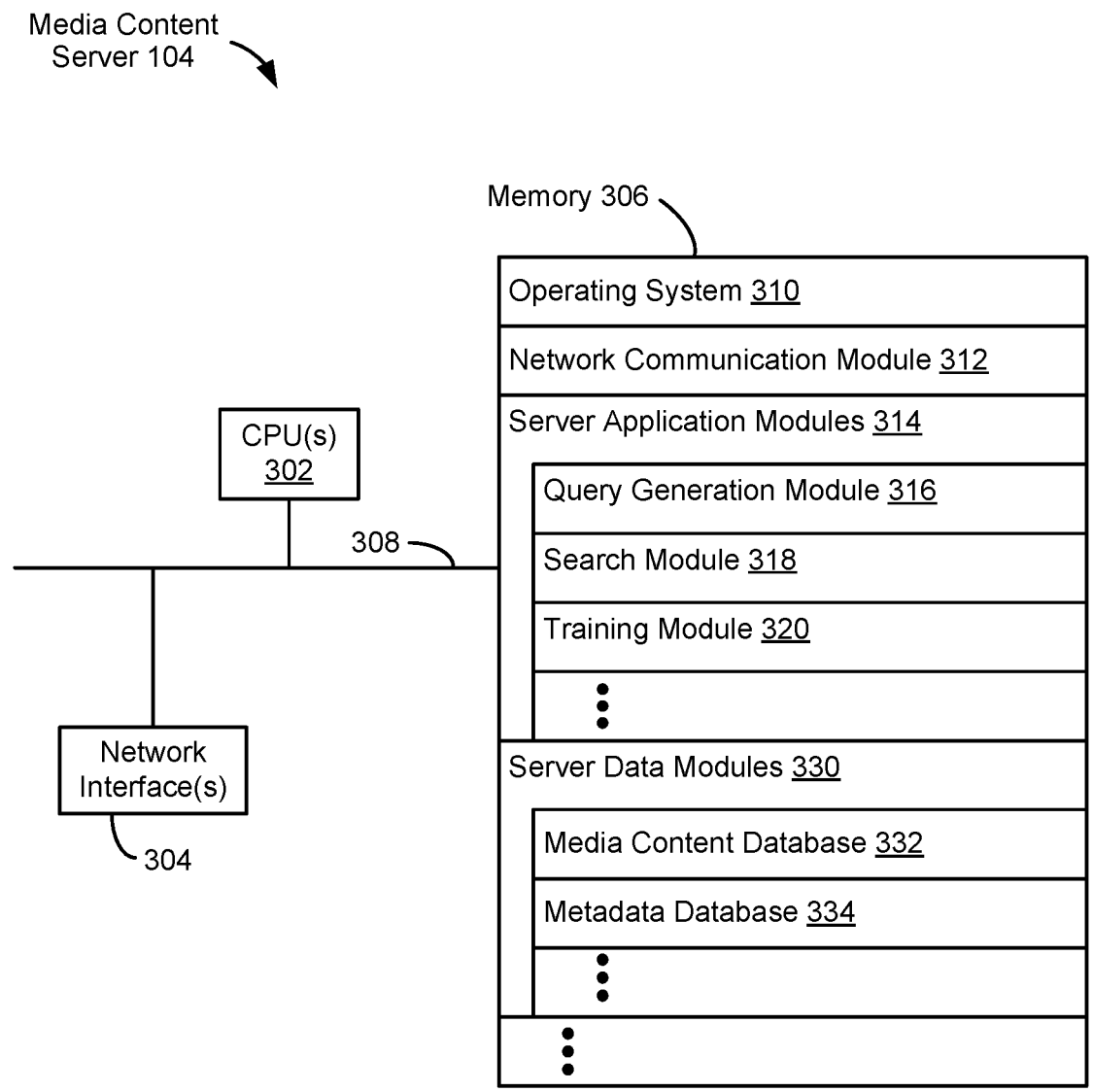
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 104 to other computing devices via one or more network interfaces 304 (wired or wireless) connected to one or more networks 112;

one or more server application modules 314 for performing various functions with respect to providing and managing a content service, the server application modules 314 including, but not limited to, one or more of:

a query generation module 316 for generating synthetic queries using a trained model, optionally based on a parameter indicating specificity of the synthetic query (e.g., broad or narrow);

a search module 318 for performing one or more searches based on a user-input query and/or one or more synthetic queries (e.g., selected by the user), including displaying one or more search results that match search criteria of the one or more searches;

a training module 320 for training the model for generating synthetic queries;

one or more server data module(s) 330 for handling the storage of and/or access to media items and/or metadata relating to the media items; in some embodiments, the one or more server data module(s) 330 include:

a media content database 332 for storing media items; and a metadata module 334 for storing metadata associated with each media item in media content database 332. In some embodiments, a respective content item and metadata for the content item are provided to the query generation module 316 to generate a query based on the respective content item and associated metadata.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous Javascript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4A:
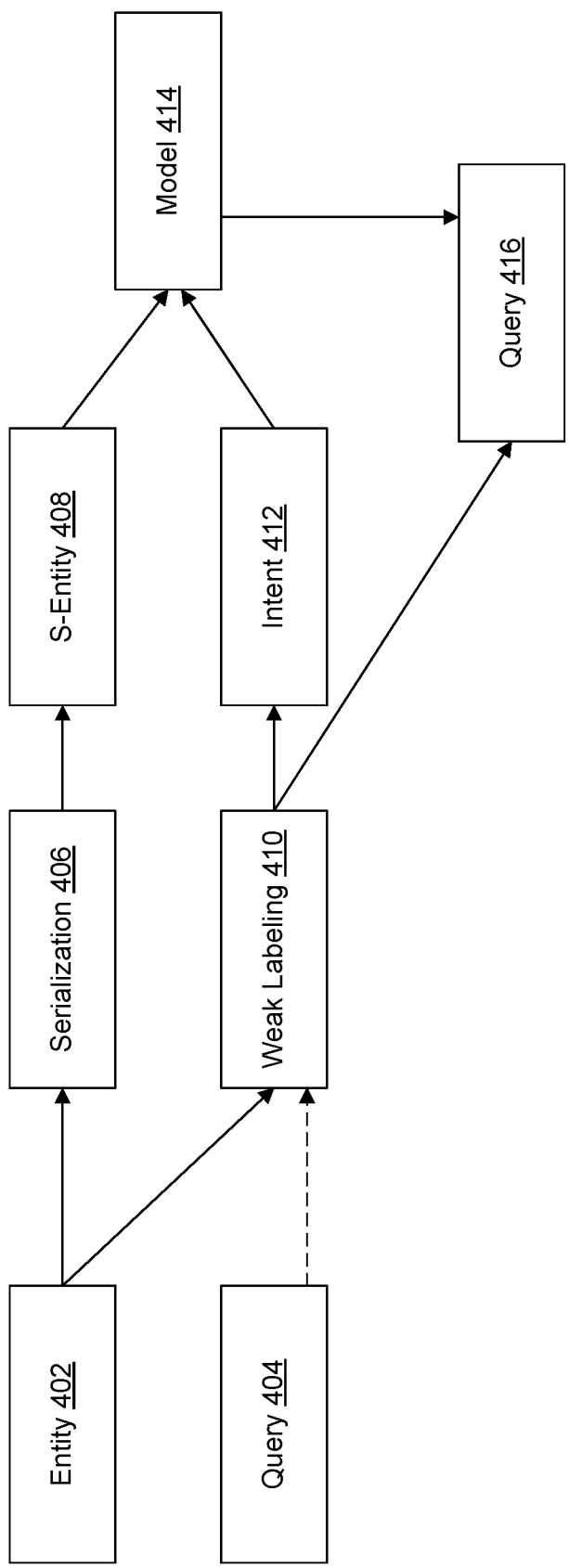
FIGS. 4A-4C are block diagrams illustrating training and using a model for generating synthetic queries, in accordance with some embodiments.
Figure 4B:
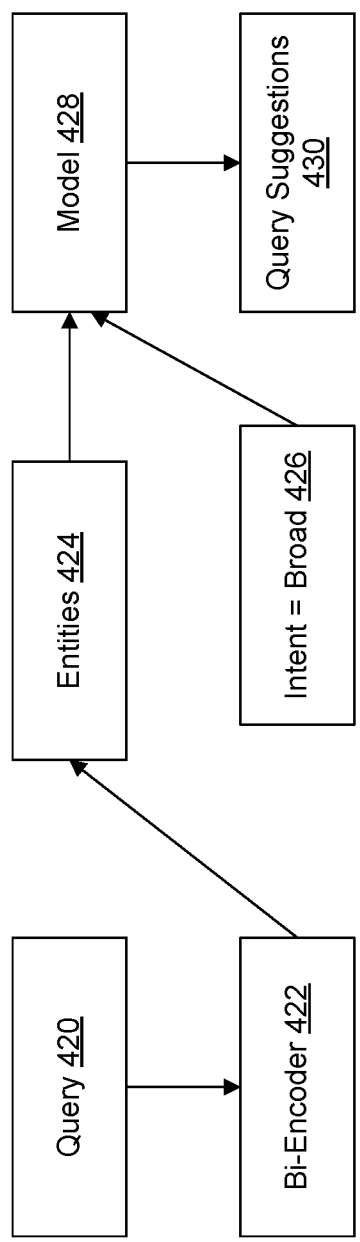
Figure 4C:
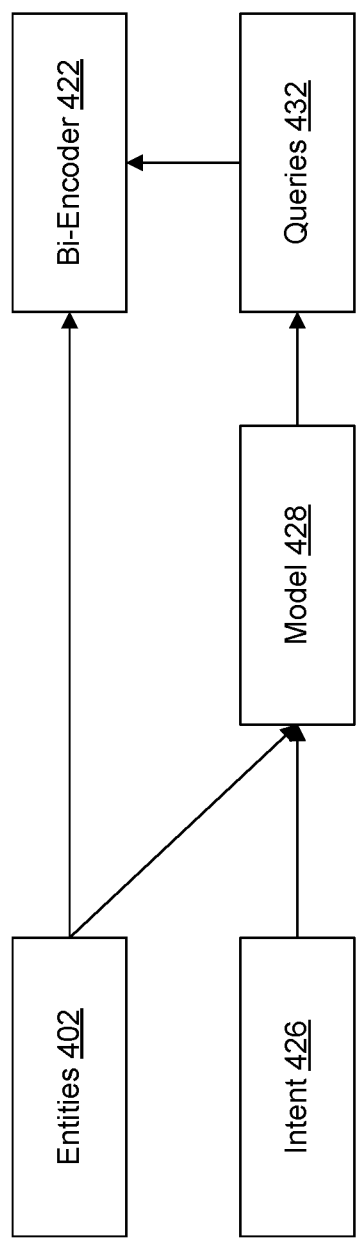

FIGS. 4A-4C illustrate block diagrams for a model for generating and using synthetic queries based on an original query (e.g., input by the user). FIG. 4A illustrates training the model for generating synthetic queries. FIG. 4B illustrates an example of using the trained model to generate a broad query from a narrow query input by the user. FIG. 4C illustrates an example of using the trained model to train a search engine (e.g., bi-encoder), e.g., by generating queries through which to train the search engine.

In some embodiments, the model for generating synthetic queries is trained, as described with reference to FIG. 4A, to control for an underlying intent (e.g., of the user) by being trained to generate both narrow queries and broad queries. As such, the model is trained for both types of intents (e.g., narrow and broad) such that the trained model is able to suggest broader and more exploratory queries to users as query suggestions (e.g., as described in more detail with reference to FIG. 4B). In some embodiments, the generated synthetic query suggestions are presented to (e.g., displayed for) the user to provide broad and/or narrow query suggestions to the user based on the original query (e.g., input by the user). For example, in response to receiving a narrow query input by the user, the system generates a broad query, based on the narrow query, in order to provide additional search results that may not have been identified from the narrow query input by the user (e.g., as described with reference to FIG. 4B).

For example, in FIG. 4A, a model 414 is trained to generate a query 416. In some embodiments, the model is trained to generate synthetic queries from an entity 402, optionally without receiving an input query 404.

In some embodiments, an entity 402 is provided during training of the model. For example, entity 402 includes information (e.g., metadata) corresponding to a media content item (e.g., a music track, a product, a book, or other media item).

In some embodiments, the training of the model includes performing serialization 406 of the entity 402 by concatenating the values for different types of metadata (e.g., title, author name(s), etc.) to produce a serialized entity (S-Entity 408). For example, serialization 406 is used to obtain a text representation (e.g., a string representation) for entity 402 so that text-based models can be used (e.g., by using the serialized entity 408 as an input). In some embodiments, the serialization function used to perform serialization 406 comprises concatenating every metadata column for the entity 402 with their respective values. For example, for an entity 402 (e.g., a book) with metadata columns: title, series name, author names, publication year, language, genres, description, review, and/or lists, the value stored for each metadata column is concatenated (e.g., optionally to different lengths). In some embodiments, different types of entities are associated with different metadata columns (e.g., tracks, podcasts, and books are each associated with different metadata columns).

In some embodiments, weak labeling 410 (e.g., a weak labeling function) is used (e.g., instead of manually labeled data) during training. In some embodiments, to generate training data using weak labeling 410, the system access a log of existing queries and determines the intent of those queries, which is used as intent 412 in the training. In some embodiments, training the model includes generating a training query (e.g., query 416) for a media content item (e.g., corresponding to entity 402) by using a weak labeling 410 function that applies a set of rules to the metadata associated with entity 402. In some embodiments, training the model includes generating multiple training queries, each with a different specified intent. For example, a first query is generated for entity 402 by applying a first set of rules to the metadata associated with entity 402 with a narrow intent specified, and a second training query is generated for entity 402 by applying a second set of rules to the metadata associated with the entity 402 with a broad intent specified.

As such, in some embodiments, the model does not require training data (e.g., labeled training data) to generate synthetic queries (e.g., query 416) for entity 402. In some embodiments, the weak labeling function generates data based on heuristics (e.g., the set of rules described above). In some embodiments, the weak labeling function is an unsupervised labeling function that generates a query and intent for any given entity (e.g., from an entity, the weak labeling function uses narrow fields and broad fields of the metadata columns to generate narrow queries and broad queries, respectively). In some embodiments, the weak labeling function requires that queries are related to each entity, and is thus based on intent prediction of the given query (e.g., the query is used to determine whether the intent is broad or narrow).

In some embodiments, the weak labeling function comprises an unsupervised weak labeling function that is able to generate both query and intents for any given entity. For example, a set of metadata columns are set that are inherently associated with narrow intent queries since the columns can identify the entity (narrow-fields), e.g., title and artists, and a set of metadata columns that capture characteristics of the entity that other entities might also have, e.g. genres, and thus can be considered to be broad columns (broad-fields). In some embodiments, terms are randomly sampled from all possible combinations of the respective fields. For example, to generate a narrow intent query in the music domain, either the title of a track, the album, the artist or combinations of the three (e.g., or other metadata columns) are used. After sampling terms from such respective columns for the query, a number of functions are applied to generate query variations in a stochastic manner, such as by shuffling words, adding misspellings and removing prefixes. In some embodiments, when generating broad queries, metadata columns that are based on free text (broadfields-ft), e.g. reviews, are differentiated from the columns which are already category-like terms (broad-fields), e.g. genres. For the free text columns, in order to avoid selecting terms which are uninformative, in some embodiments, a sampling strategy is applied which prioritizes terms with higher inverse document frequency (IDF). As another weak labeling function for the free text columns, in some embodiments, a text summarization model is applied to select more informative terms.

In some embodiments, the set of rules applied to the metadata comprises one or more rules that classify each metadata type as broad (e.g., general, high-level) or narrow (e.g., specific, individualized) metadata. For example, certain columns (e.g., fields) of the metadata are identified as broad metadata according to the one or more rules, including a genre, a year, a language, while other columns of the metadata are identified as narrow metadata according to the one or more rules, such as, an artist name, a title, an album name, etc. In some embodiments, using the one or more rules, a first training query is generated (e.g., based on a training value of "broad") by using the metadata that is identified as broad metadata and a second training query is generated (e.g., based on a training value of "narrow") by using metadata that is identified as narrow metadata. The model 414 is trained using both the first and second training queries. As such, training the model 414 includes training the model using two queries for respective media content items, each query generated from the metadata of the same respective media content item using different values of intent (e.g., broad or narrow).

In some embodiments, the weak labeling function comprises an intent prediction function, which requires, as an input, queries (e.g., query 404) that are related to each entity (e.g., entity 402). In some embodiments, existing data of entities and queries, e.g. query logs with clicked entities, are used to predict if the query is broad or narrow based on its narrow and broad columns. For example, if the similarity of the query and the values of the narrow queries is higher than the similarity of the query with the values of the broad queries than the weak label will be deemed narrow, otherwise broad. For example, if the entity is a book with the title "The Brothers Karamazov", and the input query is "Karamazov", the label would be narrow whereas if the input query is "Russian theological fiction" the label would be broad as it would be more similar to the categories of the book.

In some embodiments, input query 404 is optionally provided to the model during training (e.g., depending on which weak labeling function is used).

In some embodiments, intent 412 is used to control for different types of intent during training. For example, during training, intent 412 is labeled (e.g., using the weak labeling function described above) as "narrow" or "broad." In some embodiments, intent 412 is a value that represents query specificity. In some embodiments, a narrow intent (e.g., also referred to as a focused search) corresponds to a search query in which the user has the goal, or intent, of finding a specific entity, while a broad intent (e.g., also referred to as a non-focused search) corresponds to a search query where the user is in an exploratory mindset.

The S-entity 408 (e.g., serialized metadata associated with the entity 402) and the determined intent 412 are provided, during training, as inputs to the model 414, which is trained to output a predicted query 416 (e.g., query 416 whose determined intent 412 was determined using weak labeling 410).

FIG. 4B illustrates a model for improving retrievability by modifying the queries and specifying an intent. For example, for a received query 420 (e.g., a user-entered query with a narrow intent), bi-directional encoder 422 is used to generate entities 424 that match one or more search criteria of query 420. In some embodiments, the generated entities 424 are provided to the model described with reference to FIG. 4A (e.g., entities 424 are fed to the model as entity 402), whereby the model 428 generates query suggestions 430. In some embodiments, an intent is also provided to model 428.

For example, the intent is set to broad 426 such that the model will provide the user with additional query suggestions 430 (e.g., that are suggested based on the broad intent), which are distinct from the queries that would have been provided based on the query 420 directly (e.g., had the intent not been changed to broad). As such, the user is introduced to additional content that matches the broad query suggestion as opposed to only content that matches the initial narrow query.

FIG. 4B illustrates that, in some embodiments, the model 428 is enabled to, from a query 420 (e.g., a query with narrow intent), provide the user with query suggestions 430 for a broad intent. In some embodiments, query suggestions 430 are displayed for (e.g., provided to) the user in a search user interface. For example, within a search user interface, the user inputs (e.g., via text input or voice input) a query 420. In response to the user input, the system determines one or more entities (e.g., media content items) that match the search criteria identified by the search query input by the user. In some embodiments, the model 428 takes the one or more entities that match the search criteria, and the intent is set to broad 426 to generate synthetic query suggestions 430 to generate a broader version of the user's query 420. In some embodiments, the broad query suggestions 430 are displayed for the user in the search user interface. In some embodiments, the user is enabled to select one or more of the broad query suggestions 430, and in response to detecting user selection of a respective query suggestion, the selected query suggestion is used as the search query (e.g., replacing the search query input by the user). In some embodiments, the system provides one or more search results that match search criteria indicated by the selected query suggestion.

FIG. 4C illustrates that, in some embodiments, entities 424 and queries 432 (generated by model 428 for those entities 424) are used as training data (e.g., synthetic training data) for a search retrieval system (bi-encoder 422). For example, the search retrieval system is trained to return entities 402 in response to receiving queries 432. In some circumstances, the training is generalizable so that the search system is better able to respond to queries on which it has not been trained.

To that end, in some embodiments, the generated queries generated using the trained model 414 are used to train bi-encoder retrieval models. For example, for a randomly sampled set of entities $\epsilon'$ from the collection $\epsilon$, trained model 414 is applied with both desired intents $q_{narrow}'$=G(e, narrow) and $q_{broad}'$=G(e, broad). In some embodiments, a desired weight proportion of broad queries and narrow queries is provided and training instances are sampled from the synthetic generated queries Q' for training the Bi-Encoder. This provides a dataset of pairs of synthetic queries and respective relevant entities that can be used to train bi-encoder models, controlling for the desired (e.g., preselected) proportion of underlying intents.

Note that, in the embodiment shown in FIG. 4C, queries 432 generated by the model 428 are not typically provided directly to users of the media-providing service. Rather, after the search retrieval system is trained (or re-trained) using the entities 424 and corresponding queries 432, the system receives a user-generated query, uses the trained/retrained search engine to identify results (e.g., media content items) for the user-generated query to the user, and provides those results to the user. In some embodiments, providing the results comprises playing back the identified results (media content items) to the user. In some embodiments, providing the results comprises displaying, in a user interface of the user's device, selectable affordances corresponding to some or all of the results and playback of a respective media content item is initiated in response to user selection of one of the selectable affordances.

Figure 5B:
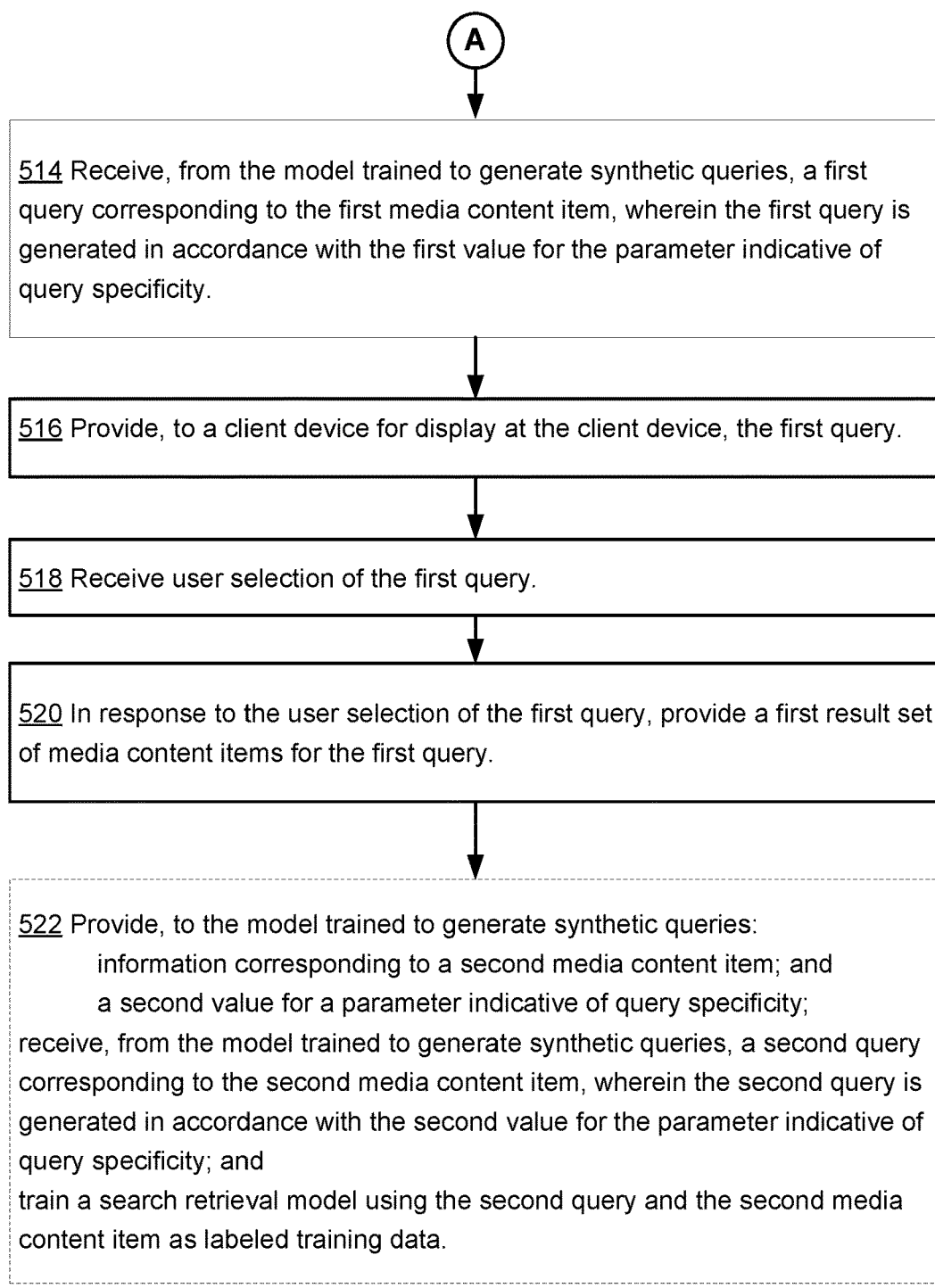

FIGS. 5A-5B are flow diagrams illustrating a method 500 of generating a synthetic query, in accordance with some embodiments. Method 500 may be performed at an electronic device (e.g., media content server 104 and/or electronic device(s) 102) having one or more processors and memory storing instructions for execution by the one or more processors. In some embodiments, the method 500 is performed by executing instructions stored in the memory (e.g., memory 212, FIG. 2, memory 306, FIG. 3) of the electronic device. In some embodiments, the method 500 is performed by a combination of the server system (e.g., including media content server 104 and CDN 106) and a client device.

Referring now to FIG. 5A, in performing the method 500, in some embodiments, the electronic device, prior to providing information corresponding to a first media content item to a model (e.g., model 428) trained to generate synthetic queries: receives (502), from a client device, a second query input by a user of the client device (e.g., query 420); and determines a second result set of media content items for the second query that includes the first media content item (e.g., entities 424). In some embodiments, the information corresponding to the first media content item is provided to the model trained to generate synthetic queries in accordance with the second result set of media content items for the second query including the first media content item. For example, entities 424 includes media content items that are related to the user-input query 420. As such, the electronic device generates a broader version of the user input query as described with reference to FIG. 4B.

In some embodiments, prior to providing the information corresponding to the first media content item to the model trained to generate synthetic queries: the electronic device generates (504), without human labeling, training data for the model; and trains the model to generate synthetic queries using the training data for the model, as described with reference to FIG. 4A.

In some embodiments, generating, without human labeling, the training data for the model includes (506): obtaining information corresponding to a second media content item; generating a first training query for the second media content item by applying, to the information corresponding to the second media content item, a first set of rules (e.g., according to the weak labeling function (e.g., weak labeling 410)) for generating training queries having a first training value of the parameter indicative of query specificity (e.g., intent 412 is set to narrow); and generating a second training query (e.g., different from the first training query) for the second media content item by applying, to the information corresponding to the second media content item, a second set of rules for generating training queries having a second training value (e.g., different from the first value) of the parameter indicative of query specificity (e.g., intent 412 is set to broad). As such training the model includes generating broad and narrow training queries for the same media content item, as described with reference to FIG. 4A.

In some embodiments, training the model to generate synthetic queries using the training data for the model includes (508) training the model using: the first training query and the first training value; and the second training query and the second training value. For example, model 414 is trained with intent 412 set to broad and/or narrow, and the model is trained to output query 416 that was determined from the weak labeling function 410.

The electronic device provides (510), to a model trained to generate synthetic queries: information (e.g., metadata) corresponding to a first media content item; and a first value for a parameter indicative of query specificity. For example, in FIG. 4B, metadata for entities 424 is provided to model 428 and the intent value is set to a particular value (e.g., broad or narrow). In some embodiments, the model receives entities 424 and a value of the intent parameter without receiving an initial user query (e.g., query 420). For example, the model 428 is trained to generate synthetic query suggestions 430 for any intent (e.g., broad or narrow), wherein the intent is optionally set by an administrator of model 428, and for one or more entities 424 that are identified in a manner other than via an initial search query from a user. For example, entities 424 are identified as corresponding to media items that are within a selected playlist, album, or are otherwise selected (e.g., optionally without receiving a search query from a user).

In some embodiments, the information corresponding to the first media content item includes (512) metadata for the first media content item. In some embodiments, the synthetic queries generated by the model are based on the metadata for the first media content item. For example, model 428 generates query suggestions 430 that are based on the metadata of entities 424 such that the query suggestions 430 are related to the entities 424 identified by the user's original query (e.g., query 420).

The electronic device receives (514), from the model trained to generate synthetic queries, a first query corresponding to the first media content item, wherein the first query is generated in accordance with the first value for the parameter indicative of query specificity. For example, query suggestions 430 are provided for the indicated intent (e.g., broad intent 426 in FIG. 4B).

The electronic device provides (516), to a client device for display at the client device, the first query. For example, the one or more query suggestions 430 are displayed in a search user interface for the user, as described with reference to FIG. 4B.

The electronic device receives (518) user selection of the first query. For example, as described with reference to FIG. 4B, the user is enabled to select one or more of the query suggestions 430 (e.g., to select the respective query as the new search query to retrieve search results related to the new search query).

The electronic device, in response to the user selection of the first query, provides (520) a first result set of media content items for the first query (e.g., which may or may not include the first media content item and includes one or more media content items distinct from the first media content item). For example, as described above with reference to FIG. 4B, the search query is updated to the selected search query (e.g., from query suggestions 430) and the search results are based on the selected search query (e.g., which is synthetically generated by the model 428, and not manually input or created by the user). In some embodiments, because query suggestions 430 are based on entities 424 (e.g., which are identified using Bi-encoder 422 from the user-input query 420), in some embodiments, the search results that are determined from a synthetic query selected from query suggestions 430 include one or more media items are included in entities 424.

In some embodiments, the electronic device provides (522), to the model trained to generate synthetic queries: information corresponding to a second media content item; and a second value for a parameter indicative of query specificity (e.g., indicative of a broad search). For example, as described with reference to FIG. 4B, the intent is set to broad 426. In some embodiments, the electronic device receives, from the model trained to generate synthetic queries, a second query corresponding to the second media content item, wherein the second query is generated in accordance with the second value for the parameter indicative of query specificity; and trains a search retrieval model using the second query and the second media content item as labeled training data. For example, as described with reference to FIG. 4B, the intent is broad 426 is provided to model 428, in addition to the entities 424 (e.g., second media content item), and the model generates the query suggestions 430.

Although FIGS. 5A-5B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
providing, to a model trained to generate synthetic queries:
information corresponding to a first media content item; and
a first value for a parameter indicative of query specificity that specifies a broadness and/or narrowness for a first generated synthetic query;
receiving, from the model trained to generate synthetic queries, the first generated synthetic query, wherein the first generated synthetic query corresponds to the first media content item, wherein the first generated synthetic query is generated in accordance with the first value for the parameter indicative of query specificity that specifies a broadness and/or narrowness for the first generated synthetic query;
providing, to a client device for display at the client device, the first generated synthetic query;
receiving user selection of the first generated synthetic query; and
in response to the user selection of the first generated synthetic query, providing a first result set of media content items for the first generated synthetic query.

2. The method of claim 1, further including, prior to providing the information corresponding to the first media content item to the model trained to generate synthetic queries:
receiving, from the client device, a second query input by a user of the client device; and
determining a second result set of media content items for the second query that includes the first media content item;
wherein the information corresponding to the first media content item is provided to the model trained to generate synthetic queries in accordance with the second result set of media content items for the second query including the first media content item.

3. The method of claim 1, wherein the information corresponding to the first media content item includes metadata for the first media content item.

4. The method of claim 1, further comprising, prior to providing the information corresponding to the first media content item to the model trained to generate synthetic queries:
generating, without human labeling, training data for the model; and
training the model to generate synthetic queries using the training data for the model.

5. The method of claim 4, wherein generating, without human labeling, the training data for the model includes:
obtaining information corresponding to a second media content item;
generating a first training query for the second media content item by applying, to the information corresponding to the second media content item, a first set of rules for generating training queries having a first training value of the parameter indicative of query specificity; and
generating a second training query for the second media content item by applying, to the information corresponding to the second media content item, a second set of rules for generating training queries having a second training value of the parameter indicative of query specificity.

6. The method of claim 5, wherein training the model to generate synthetic queries using the training data for the model includes training the model using:
the first training query and the first training value; and
the second training query and the second training value.

7. The method of claim 1, further comprising:
providing, to the model trained to generate synthetic queries:
information corresponding to a second media content item; and
a second value for a parameter indicative of query specificity;
receiving, from the model trained to generate synthetic queries, a second generated synthetic query corresponding to the second media content item, wherein the second generated synthetic query is generated in accordance with the second value for the parameter indicative of query specificity; and
training a search retrieval model using the second generated synthetic query and the second media content item as labeled training data.

8. An electronic device, comprising:
one or more processors; and memory storing one or more programs, the one or more programs including instructions for:

providing, to a model trained to generate synthetic queries:
- information corresponding to a first media content item; and
- a first value for a parameter indicative of query specificity that specifies a broadness and/or narrowness for a first generated synthetic query;

receiving, from the model trained to generate synthetic queries, the first generated synthetic query, wherein the first generated synthetic query corresponds to the first media content item, wherein the first generated synthetic query is generated in accordance with the first value for the parameter indicative of query specificity that specifies a broadness and/or narrowness for the first generated synthetic query;

providing, to a client device for display at the client device, the first generated synthetic query;

receiving user selection of the first generated synthetic query; and in response to the user selection of the first generated synthetic query, providing a first result set of media content items for the first generated synthetic query.

9. The electronic device of claim 8, the one or more programs further including instructions for, prior to providing the information corresponding to the first media content item to the model trained to generate synthetic queries:

receiving, from the client device, a second query input by a user of the client device; and determining a second result set of media content items for the second query that includes the first media content item;

wherein the information corresponding to the first media content item is provided to the model trained to generate synthetic queries in accordance with the second result set of media content items for the second query including the first media content item.

10. The electronic device of claim 8, wherein the information corresponding to the first media content item includes metadata for the first media content item.

11. The electronic device of claim 8, the one or more programs further including instructions for, prior to providing the information corresponding to the first media content item to the model trained to generate synthetic queries:

generating, without human labeling, training data for the model; and training the model to generate synthetic queries using the training data for the model.

12. The electronic device of claim 11, wherein generating, without human labeling, the training data for the model includes:

obtaining information corresponding to a second media content item;

generating a first training query for the second media content item by applying, to the information corresponding to the second media content item, a first set of rules for generating training queries having a first training value of the parameter indicative of query specificity; and generating a second training query for the second media content item by applying, to the information corresponding to the second media content item, a second set of rules for generating training queries having a second training value of the parameter indicative of query specificity.

13. The electronic device of claim 12, wherein training the model to generate synthetic queries using the training data for the model includes training the model using:
- the first training query and the first training value; and
- the second training query and the second training value.

14. The electronic device of claim 8, the one or more programs further including instructions for:

providing, to the model trained to generate synthetic queries:
- information corresponding to a second media content item; and
- a second value for a parameter indicative of query specificity;

receiving, from the model trained to generate synthetic queries, a second generated synthetic query corresponding to the second media content item, wherein the second generated synthetic query is generated in accordance with the second value for the parameter indicative of query specificity; and training a search retrieval model using the second generated synthetic query and the second media content item as labeled training data.

15. A non-transitory computer-readable storage medium storing one or more programs for execution by an electronic device with one or more processors, the one or more programs including instructions for:

providing, to a model trained to generate synthetic queries:
- information corresponding to a first media content item; and
- a first value for a parameter indicative of query specificity that specifies a broadness and/or narrowness for a first generated synthetic query;

receiving, from the model trained to generate synthetic queries, the first generated synthetic query, wherein the first generated synthetic query corresponds to the first media content item, wherein the first generated synthetic query is generated in accordance with the first value for the parameter indicative of query specificity that specifies a broadness and/or narrowness for the first generated synthetic query;

providing, to a client device for display at the client device, the first generated synthetic query;

receiving user selection of the first generated synthetic query; and in response to the user selection of the first generated synthetic query, providing a first result set of media content items for the first generated synthetic query.

16. The non-transitory computer-readable storage medium of claim 15, the one or more programs further including instructions for, prior to providing the information corresponding to the first media content item to the model trained to generate synthetic queries:

receiving, from the client device, a second query input by a user of the client device; and determining a second result set of media content items for the second query that includes the first media content item;

wherein the information corresponding to the first media content item is provided to the model trained to generate synthetic queries in accordance with the second result set of media content items for the second query including the first media content item.

17. The non-transitory computer-readable storage medium of claim 15, wherein the information corresponding to the first media content item includes metadata for the first media content item.

18. The non-transitory computer-readable storage medium of claim 15, the one or more programs further including instructions for, prior to providing the information corresponding to the first media content item to the model trained to generate synthetic queries:
- generating, without human labeling, training data for the model; and
- training the model to generate synthetic queries using the training data for the model.

19. The non-transitory computer-readable storage medium of claim 18, wherein generating, without human labeling, the training data for the model includes:
- obtaining information corresponding to a second media content item;
- generating a first training query for the second media content item by applying, to the information corresponding to the second media content item, a first set of rules for generating training queries having a first training value of the parameter indicative of query specificity; and
- generating a second training query for the second media content item by applying, to the information corresponding to the second media content item, a second set of rules for generating training queries having a second training value of the parameter indicative of query specificity.

20. The non-transitory computer-readable storage medium of claim 19, wherein training the model to generate synthetic queries using the training data for the model includes training the model using:
- the first training query and the first training value; and
- the second training query and the second training value.

\* \* \* \* \*